United States Patent
Keim et al.

(10) Patent No.: US 7,328,347 B2
(45) Date of Patent: Feb. 5, 2008

(54) METHOD AND APPARATUS FOR DISTINGUISHING THE ORIGIN OF OPERATOR INPUTS IN ELECTRONIC CONTROL SYSTEMS AND PRINTING MACHINE HAVING THE APPARATUS

(75) Inventors: Reiner Keim, Rheinstetten (DE); George Rößler, Angelbachtal (DE); Mario Rottloff, Neckargemünd (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 88 days.

(21) Appl. No.: 11/274,788

(22) Filed: Nov. 15, 2005

(65) Prior Publication Data

US 2006/0179477 A1 Aug. 10, 2006

(30) Foreign Application Priority Data

Nov. 15, 2004 (DE) .................. 10 2004 055 066

(51) Int. Cl.
*H04L 9/00* (2006.01)
*G05B 19/18* (2006.01)

(52) U.S. Cl. ........................... 713/177; 700/65
(58) Field of Classification Search ................ 713/168, 713/169, 170, 176, 177; 700/79
See application file for complete search history.

(56) References Cited

U.S. PATENT DOCUMENTS

| | | | | |
|---|---|---|---|---|
| 5,347,581 A * | 9/1994 | Naccache et al. | ............. | 380/30 |
| 5,479,509 A * | 12/1995 | Ugon | ............. | 713/176 |
| 5,825,880 A * | 10/1998 | Sudia et al. | ............. | 713/180 |
| 6,212,281 B1 * | 4/2001 | Vanstone | ............. | 380/282 |
| 6,499,104 B1 * | 12/2002 | Joux | ............. | 713/176 |
| 6,826,687 B1 * | 11/2004 | Rohatgi | ............. | 713/171 |
| 6,985,583 B1 * | 1/2006 | Brainard et al. | ............. | 380/44 |
| 7,024,552 B1 * | 4/2006 | Caswell et al. | ............. | 713/155 |
| 7,039,807 B2 * | 5/2006 | Spitz | ............. | 713/170 |
| 7,047,414 B2 * | 5/2006 | Wheeler et al. | ............. | 713/176 |
| 7,058,971 B1 * | 6/2006 | Horikiri | ............. | 726/7 |
| 7,095,855 B1 * | 8/2006 | Collins | ............. | 380/241 |
| 7,140,039 B1 * | 11/2006 | Yemeni et al. | ............. | 726/9 |
| 7,165,179 B2 * | 1/2007 | Maruyama et al. | ............. | 713/176 |
| 7,194,763 B2 * | 3/2007 | Potter et al. | ............. | 726/7 |
| 2004/0190916 A1 | 9/2004 | Seeler et al. | | |
| 2005/0278528 A1 * | 12/2005 | Kathan | ............. | 713/168 |

FOREIGN PATENT DOCUMENTS

| | | | |
|---|---|---|---|
| DE | 42 12 200 A1 | 2/1993 | |
| DE | 102 50 186 A1 | 5/2004 | |
| DE | 102 50 195 A1 | 5/2004 | |
| EP | 1 479 964 A2 | 11/2004 | |
| JP | 5054207 | 3/1993 | |
| JP | 5061508 | 3/1993 | |
| JP | 5064207 | 3/1993 | |
| WO | 2004/039032 A2 | 5/2004 | |

* cited by examiner

*Primary Examiner*—Thomas K. Pham
(74) *Attorney, Agent, or Firm*—Laurence A. Greenberg; Werner H. Stemer; Ralph E. Locher

(57) ABSTRACT

A method and an apparatus distinguish the origin of operator inputs in electronic control systems having at least one first operating element and at least one second operating element. A first signal is processed in the electronic control system when the at least one first operating element is operated. The first signal differs from a second signal emitted by the at least one second operating element when the latter is operated, by virtue of an electronic identifier assigned to the at least one first operating element. A printing machine having the apparatus is also provided.

15 Claims, 2 Drawing Sheets

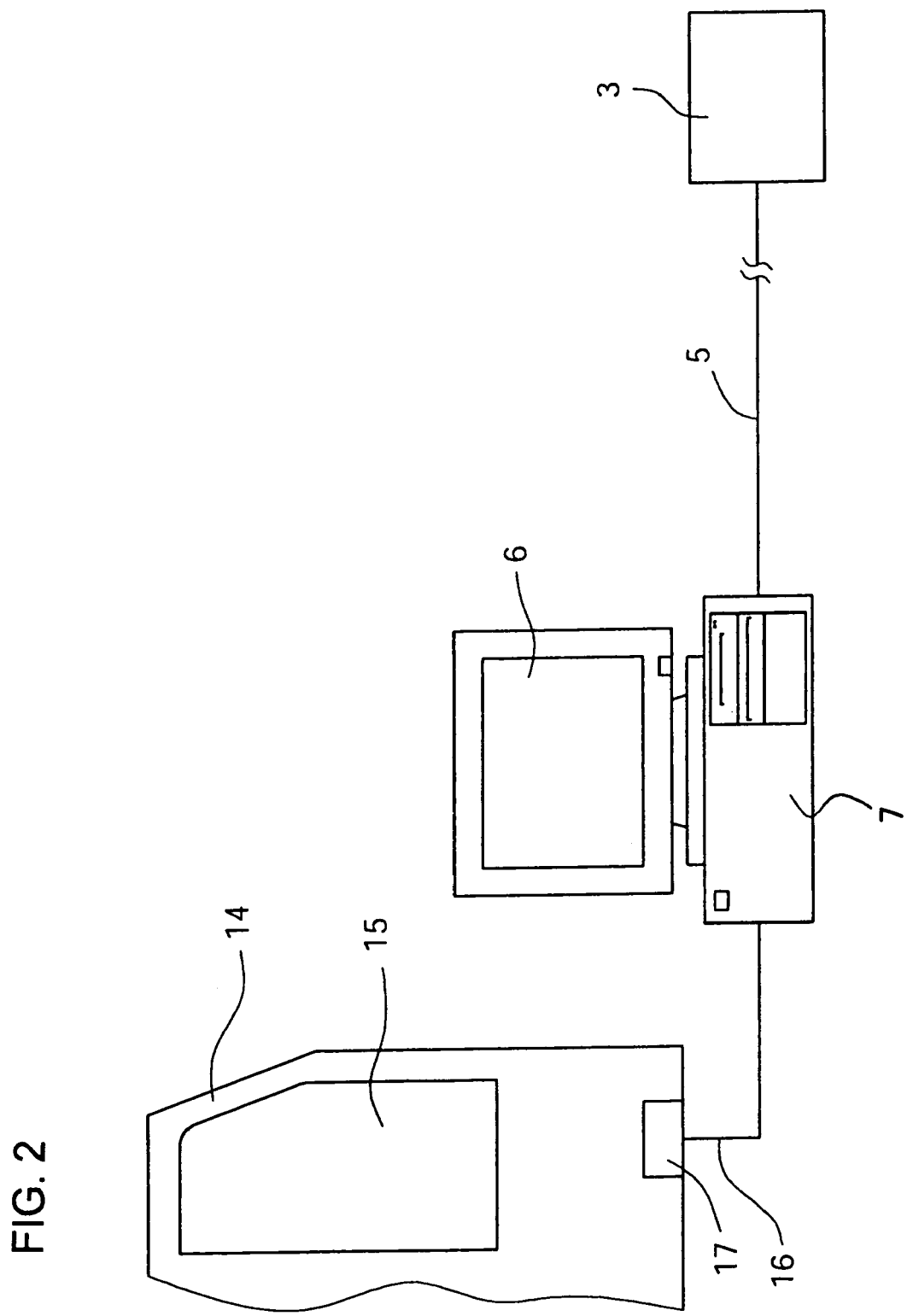

METHOD AND APPARATUS FOR DISTINGUISHING THE ORIGIN OF OPERATOR INPUTS IN ELECTRONIC CONTROL SYSTEMS AND PRINTING MACHINE HAVING THE APPARATUS

BACKGROUND OF THE INVENTION

Field of the Invention

The present invention relates to a method and an apparatus for distinguishing the origin of operator inputs in electronic control systems having at least one first operating element and at least one second operating element. The invention also relates to a printing machine having the apparatus.

Electronic data processing and the transmission of electronic data through data networks, such as the telephone line network, make it possible not only to network electronically or electrically controlled devices to one another over great distances but also to operate devices which are far away. In the meantime, it has thus become possible to switch on domestic appliances—which are situated in an apartment, have appropriate communication electronics and can be connected to a data transmission network such as the telephone network—from a great distance or to supply them with appropriate control commands. German Published, Non-Prosecuted Patent Application DE 42 12 200 A1, corresponding to Patent Abstracts of Japan Publication Nos. 05061508A and 05064207A, for example, thus shows a remote control system for operating domestic appliances using an IC card with an integrated chip and a remote public telephone. To this end, the public telephone has a card slot into which a person can insert an IC card in order to identify himself or herself. The control information and identification information present in the IC card are intended to offer a high degree of security so that only authorized persons can access the domestic appliances (which can be remotely controlled) through the public telephone network. In order to make remote control possible, the domestic appliances are connected to a household terminal which is, in turn, connected to a telephone. Domestic appliances which can be remotely controlled are, for example, television sets, video recorders as well as a hot water supply, etc. The data contained in the IC card are transmitted through the telephone network in encrypted form and are received by the domestic terminal where the data are then accordingly decrypted again and can control the connected appliances. However, the control data are transmitted only when the person using the public telephone has appropriately identified himself or herself by using the correct IC card. In addition, the operator using the public telephone must also enter a password number which is known only to the authorized user. That makes it possible to control domestic appliances in the apartment from any point on earth where there is an appropriately equipped telephone. Identification with an IC card and a password makes it possible for only authorized persons to control the domestic appliances. Access control which is tied to the ownership of the IC card and the knowledge of the correct password thus takes place.

However, the disadvantage of a system in accordance with German Published, Non-Prosecuted Patent Application DE 42 12 200 A1, corresponding to Patent Abstracts of Japan Publication Nos. 05061508A and 05064207A, is the fact that the authorized person must constantly have an IC card with him or her and that identification using the IC card and the password is very time-consuming. The telephones which are intended to be used to carry out such an identification process must also have an appropriately configured card slot for the IC card. That method is therefore not suited to maintaining and controlling machines in industry. Many machines in industry have, in the meantime, been maintained at regular intervals through remote maintenance systems or remotely through data networks when correspondingly required and, if appropriate, have also been controlled by using appropriate operating commands. In that case, there is a local control computer which, in principle, controls the relevant machine during normal operation, has corresponding local operating elements such as a keyboard or computer mouse and can use a corresponding interface to communicate with a maintenance computer, for example at the machine manufacturer's premises, through the Internet. That makes it possible, from a second computer which is at the machine manufacturer's premises, to effect maintenance operations on a machine which has been installed far away without the servicing personnel having to be on site. Appropriate remote control technology makes it possible for the maintenance personnel at the manufacturer's premises to find exactly the same programs and, above all, the same operator interfaces on its maintenance computer and the associated display screen as on the local computer which is directly on the machine. In principle, the maintenance personnel thus have the same operating and intervention capabilities as the operating personnel on site. However, it is important in many machines, in particular in machines in the printing industry, that particular functions must not be activated remotely. Those include, in particular, functions which could jeopardize the safety of the operating personnel. By way of example, functions such as raising the stack on the delivery of a printing machine must not therefore be readily operated remotely because, in that case, there is a considerable risk of injury to the unsuspecting and surprised operating personnel from a stack which is being moved in that manner. The function of raising the stack on the delivery must therefore be blocked, under certain circumstances, to the remote operating computer at the manufacturer's premises. On the other hand, it is undesirable for operating systems which have been programmed differently to run on the manufacturer's computer and on the local computer on the machine since that would mean an excessively large additional outlay.

SUMMARY OF THE INVENTION

It is accordingly an object of the invention to provide a method and an apparatus for distinguishing the origin of operator inputs in electronic control systems and a printing machine having the apparatus, which overcome the hereinafore-mentioned disadvantages of the heretofore-known devices and methods of this general type and which make it possible to input operating commands on a plurality of computers having the same operator interfaces, with the above-mentioned safety problems being taken into account.

With the foregoing and other objects in view there is provided, in accordance with the invention, a method for distinguishing the origin of operator inputs in an electronic control system. The method comprises providing at least one first operating element and at least one second operating element. A first signal is processed in the electronic control system when the at least one first operating element is operated. The first signal differs from a second signal emitted by the at least one second operating element when the at least one second operating element is operated, by virtue of an electronic identifier assigned to the at least one first operating element.

With the objects of the invention in view, there is also provided an apparatus for distinguishing the origin of operator inputs. The apparatus comprises at least one first operating element emitting a first signal upon operating the at least one first operating element. The at least one first operating element has an electronic identifier assigned thereto. At least one second operating element emits a second signal upon operating the at least one second operating element. The first signal differs from the second signal by virtue of the electronic identifier. An electronic control system processes the first signal.

The method according to the invention and the apparatus according to the invention thus include an electronic control system, for example a conventional PC or server, to which operating elements can be connected. In the case of PCs, such operating elements are in the form of a computer mouse or keyboard, as standard, but other operating elements, for example a touch screen or a trackball in the case of laptops etc., are also possible. In addition to a first operating element, a second operating element is also connected to the electronic control system. The second operating element does not necessarily have to be close to the electronic control system. Whereas the electronic control system is in the vicinity of a machine to be controlled and the first operating element is used to operate the machine locally, the second operating element, in contrast thereto may, for example, be in the vicinity of a maintenance computer at the machine manufacturer's premises. The second operating element is thus at a great distance from the first operating element.

The first and second operating elements each emit signals to the electronic control system if an appropriate operator input is performed by the operating personnel. However, when the first element is operated, the electronic signal is given an electronic identifier so that it is possible to distinguish perfectly whether the operating signal now comes from the first or second operating element. If the first operating element is in the immediate vicinity of the machine, this operating element can be used to control all of the functions in the machine. However, if the control system receives signals from the second operating element which is at a distance from the machine, the electronic control system detects the electronic identifier and, in the case of particular functions, prevents the latter from being performed in the machine if the signal comes from the second operating element.

In accordance with another mode or feature of the invention, the signal provided when the first operating element is operated and the signal provided when the second operating element is operated initiate, in principle, the same function in the electronic control system. The first and second operating elements are usually of the same or similar physical construction since the two operating elements are usually the standard input elements of a computer, namely a keyboard and a computer mouse. Since the operator interface which is respectively assigned to the two operating elements is also usually of similar construction or even identical, the two operating elements may, in principle, be used to access the same functions in the machine's electronic control system. This is initially also intentional since the operator is not intended to move when he or she would like to access the machine's electronic control system from another location. The signals from the first operating element and from the second operating element thus actually differ only in terms of the electronic identifier, and only the electronic identifier then decides whether the functions which are, in principle, the same and can be initiated by the two operating elements, are actually also initiated in the electronic control system. The electronic identifier thus makes the distinction between the fundamental capability of initiating a function in the electronic control system and the actual initiation of a function in the electronic control system.

In accordance with a further mode or feature of the invention, the signal provided when the first operating element is operated is additionally provided with a signature. Electronic signatures are eminently suitable as an electronic identifier since they are relatively difficult to forge and have also proven successful in other areas such as in the authentication of emails and the like. Such a signature which is as difficult to forge as possible is required insofar as it is necessary to ensure that the electronic identifier cannot be easily emulated by other computers since it would otherwise also be possible, by emulating the electronic identifier, to access critical functions again which were actually blocked due to the missing electronic identifier, from the second operating element which is further away. This can be prevented in a very reliable manner by using an appropriate signature.

In accordance with an added mode or feature of the invention, the signals from the first and second operating elements are processed in a computer. In principle, it is also possible for the signals from the operating elements to be processed directly in the control computer of the associated machine, for example, but in reality a separate computer will usually be present. The separate computer is naturally also able to carry out other tasks, for example the connection of the machine computer to the intranet or Internet. In this case, the computer receives both the signals from the first operating element and the signals from the second operating element and can distinguish their origin by using the electronic identifier.

In accordance with an additional mode or feature of the invention, particular functions of a program are enabled or blocked by the electronic control system on the basis of the signature. The computer of the electronic control system normally has one or more programs which it uses to appropriately control the associated machine. This software may, on one hand, include machine-specific software but may also include a standardized operating system. The operating program for controlling the machine, for example a printing machine, must be able to respond to all electronically controllable functions. It goes without saying that those functions also include safety-critical functions as already mentioned at the beginning herein. These functions can now be either enabled or blocked by the electronic control system on the basis of the signatures present in the signals from the operating elements. Provision may thus be made for particular functions, for example safety-related functions, to be initiated only when the signal from the operating element is provided with a signature. If the signature is missing, the corresponding function is not initiated and, instead, a corresponding message can be sent to the initiating operating element or to a display screen associated with this operating element. That message indicates that the function is not being performed. In particular, safety-critical processes in machines can thus be initiated only by operating elements which are accordingly intended for them, so that the risk of incorrect operation by unauthorized operating elements, for example of a remote maintenance computer at the premises of a machine manufacturer, can be prevented. In a further development of this embodiment, different signatures may also be used. It is necessary to assign different signatures to different operating elements and, on the basis of the signature that is respectively used, only functions which have been enabled for that signature are able to be initiated.

In accordance with yet another mode or feature of the invention, the signature can be switched on and off in the electronic system. According to the invention, the signals from the operating elements are only provided with signatures in the electronic system depending on the signal input (of the electronic system) to which they are connected. By way of example, corresponding signatures are thus added to those signals from the operating elements which are passed to the electronic system through local signal inputs such as a keyboard socket while, in the case of interfaces, in particular network interfaces, which make it possible to connect the electronic system to the intranet or Internet, the operating signals pass from operating elements without a signature. It is thus ensured, in the case of operating signals with a signature, that they come from operating elements which are in the immediate vicinity of the electronic system and thus also of the associated machine. However, under certain circumstances, it may be necessary, for maintenance purposes, for the electronic system, that is to say the local computer, to be decoupled from the machine so that the electronic system can no longer initiate any functions in the machine. This is required, for example, when functional tests need to be carried out on the electronic system. When the electronic system is disconnected from the machine, there is also no longer any risk, however, with regard to functions which are otherwise critical to safety. In this case, during remote maintenance, it is advantageous for the maintenance personnel who would like to control the electronic system by using a second operating element which is far away, if those personnel can then also correspondingly test the safety-critical functions. To this end, the maintenance personnel can ask the operating personnel of the machine, by telephone, to disconnect the electronic system from the machine and then to switch off the electronic signature in the electronic system through the use of an appropriate input through the keyboard or computer mouse. As soon as the electronic signature has been switched off, the maintenance personnel can also remotely test safety-critical functions in the electronic system. As soon as the electronic system has been reconnected to the machine to be controlled, the signature is switched on again.

In accordance with yet a further mode or feature of the invention, the signature is automatically reactivated when the electronic system and the control components of the machine are connected together so that the safety-critical functions can be immediately safeguarded again in an appropriate manner when the electronic system and the control components of the machine are connected together. This increases the operational reliability of the machine since the operating personnel cannot then forget to switch on the signature. The machine manufacturer who performs remote maintenance can then be sure that his or her machine will operate at any time with the safety measures which have been established. This aspect of the invention can also be extended to the effect that, by appropriate inclusion in the operating software of the electronic system, the signature cannot be switched off at all by operating elements. Rather, the signature is automatically switched off if the electronic system is disconnected from the machine and the signature is automatically switched on again as soon as the electronic system is reconnected to the machine. In this case, there is no longer any human influence on the switched-on state of the signature in the electronic system.

In accordance with yet an added mode or feature of the invention, the signature is switched on or off on the basis of the program. In printing works, it has become possible, in the meantime, to control a plurality of printing machines using a single electronic system, with the result that the operating personnel do not have to continuously change back and forth between the individual printing machines but rather can control the machines centrally from an operating point, for example on a printing machine. However, since each printing machine has a slightly altered operating program depending on its configuration, the functions which can be initiated using the operating elements of the printing machines also each depend on the machine. It may thus be the case that a function is entirely critical to safety in one machine but not in the other machine since, in this case, for example, the hazardous area affected has been appropriately covered, with the result that no risk emanates therefrom. If the operating personnel now switch back and forth between the operating programs of the individual machines, only those signatures which are required for the safety-critical processes in the machine that is currently being controlled are respectively switched on. If a remote operating element accesses the relevant machine using the electronic system, the signatures can now be used to enable or bar the individual safety-critical functions on the basis of the selected machine. This increases the flexibility and simultaneously simplifies the system since, in this case, the requests from remote operating elements can be processed centrally in an electronic system, and the signing process must be carried out only in this one electronic system. Each control computer of the associated machine thus does not need to have a signing process. Rather, it is sufficient for the electronic system which manages the input of the signals from remote operating elements to have the signature function. In this case, however, all of the local operating elements must be connected to the central electronic system so that their signals can be provided with the signature.

With the objects of the invention in view, there is concomitantly provided a printing machine, comprising the apparatus according to the invention.

Other features which are considered as characteristic for the invention are set forth in the appended claims.

Although the invention is illustrated and described herein as embodied in a method and an apparatus for distinguishing the origin of operator inputs in electronic control systems and a printing machine having the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a fragmentary, diagrammatic, front-elevational view of a printing machine which can be controlled by using two operating elements.

DESCRIPTION OF THE PREFERRED EMBODIMENTS

Figure 1:
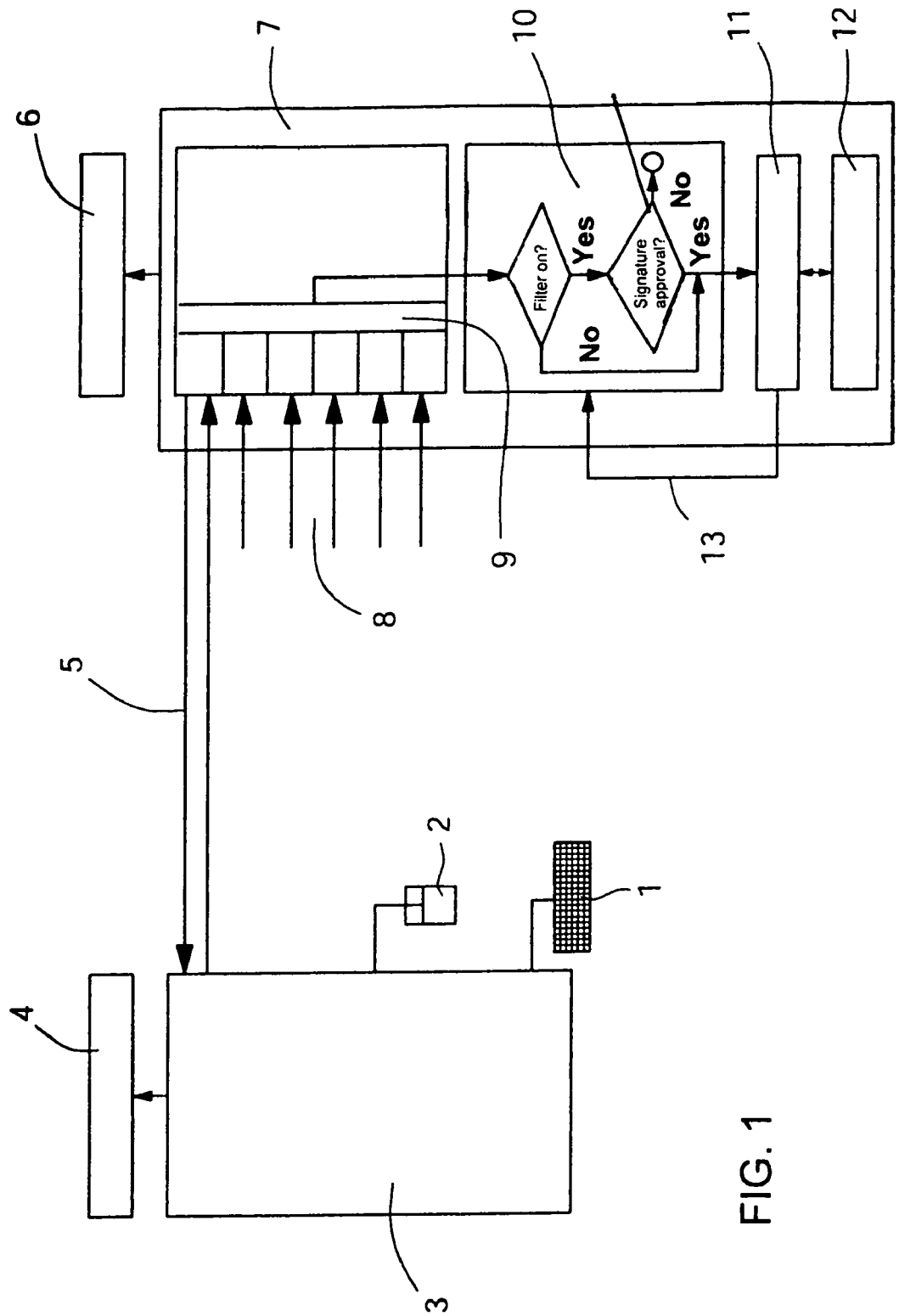
FIG. 1 is a block diagram illustrating a signing sequence in an electronic system having two operating elements.

Referring now to the figures of the drawings in detail and first, particularly, to FIG. 1 thereof, there is seen an electronic system which basically includes a local first computer 7. The local computer 7 can be used to control machines 14 (shown in FIG. 2). The local computer 7 is associated with a local display screen 6 which displays all operating processes which can be carried out by operating personnel on the local computer 7. One or more operating systems and corresponding applications software for controlling connected machines 14 may run on the local computer 7. Another program is in the form of a signing device 9 which, in FIG. 1, includes appropriately programmed software. However, it goes without saying that it is also possible for the signing device 9 to be in the form of hardware. A program 10 (which will be explained below) for checking an electronic identifier such as a signature is incorporated in the signing device 9 in the form of a separate program module in the local computer 7. In addition, an operating program 11 having a control program 12 which has safety-critical processes and controls a machine 14, is also situated in the local computer 7.

In addition, one or more local first operating elements 8, for example a keyboard or a computer mouse, are connected to the local computer 7. The local first computer 7 is furthermore connected to a remote control second computer 3 through a data transmission network 5, for example the Internet and/or intranet. Whereas the local computer 7 is in the immediate vicinity of the machine 14 to be controlled, the remote control computer 3 may be many kilometers away, for example at the machine manufacturer's premises. Just like the local computer 7, the remote control computer 3 may include a commercially available PC or laptop which likewise has a display screen 4. In addition, one or more second operating elements such as a keyboard 1 or a computer mouse 2 are also connected to the remote control computer 3. The remote control computer 3 makes it possible to access the local computer 7 through the data transmission network 5 and to initiate functions in that computer. These functions are, in turn, able to have an effect on the machine that is connected to the local computer 7. In this case, the operator interface of the local computer 7 can also be transmitted to the remote control computer 3 through the data transmission network 5, with the result that the same operator interface can be seen on the remote control display screen 4 and the local display screen 6. In principle, the same operator inputs can thus also be made on both computers 3, 7. If operator inputs are performed on the remote control computer 3, the corresponding signals from the operating elements 1, 2 are transmitted to the local computer 7 through the data transmission network 5.

However, in contrast to the signals which come from the remote control computer 3, the signals from the local operating elements 8 can additionally be provided with an electronic signature using the signing device 9. It is thus possible to distinguish in the local computer 7 whether the operating signals come from the local operating elements 8—since, in this case, the signals are provided with a signature—or whether they come from the operating elements 1, 2 of the remote control computer 3, from which the signals without a signature are passed to the local computer 7. In accordance with the diagram which is associated with the program 10 for checking the signature, a check is first of all carried out to determine whether or not a filter which distinguishes between operating signals with a signature and those without a signature is switched on. If this filter is not switched on, the signals (irrespective of whether or not they have been provided with a signature) are immediately forwarded to the operating program 11 which can then, in turn, initiate corresponding functions in the control program 12. If the control program 12 contains safety-critical processes, commands which switch on the filter using a control signal 13 are transmitted to the operating program 11 when the control program 12 is called. In this case, the program 10 for checking the signature becomes active and checks incoming operating signals for the presence of the signature. If the operating signals do not have a signature or do not have the correct signature, the operating signals are not transmitted to the operating program 11 and the control program 12 will not initiate the corresponding functions in the machine 14. It is only if the operating signals are provided with the correct signature that the operating signals are forwarded to the operating program 11 which can then initiate the corresponding functions in the control program 12. This ensures, in the case of a control program 12 having safety-critical processes, that these processes can be initiated only through the use of the input on the local operating elements 8, while the same inputs on the operating elements 1, 2 of the remote control computer 3 are rejected by the filter in the program 10 for checking the signature. In this way, the operational reliability of machines having safety-critical processes which are controlled by the local computer 7 can be considerably increased.

FIG. 2 shows such a machine 14 having safety-critical processes. In this case, the machine is a printing machine 14 which has one or more printing units 15 and its own control computer 17. The control computer 17 of the printing machine is connected to the local computer 7 through a communication connection 16. In FIG. 2 as well, the local computer 7 can interchange data with a remote control computer 3 through a data transmission network 5. Since the local computer 7 is configured in accordance with FIG. 1, the initiation of safety-critical processes in the printing machine 14 by the remote control computer 3 can be reliably prevented. It is thus possible, in principle, for the maintenance personnel to be provided, on the display screen 4 of the remote control computer 3, with the same operator interface as can be seen by the operating personnel on the local display screen 6 in the printing works and it is possible for the safety-critical functions to be initiated only by using operating elements 8 which are directly connected to the local computer 7. If the maintenance personnel try to influence these safety-critical processes from the remote control computer 3, these operating commands are not executed.

The fact that the operating commands are not executed may be indicated to the maintenance personnel on the remote control display screen 4 through the use of a corresponding message. Therefore, the maintenance personnel are informed if an input on the remote operating elements 1, 2 is not carried out.

This application claims the priority, under 35 U.S.C. §119, of German Patent Application DE 10 2004 055 066.2, filed Nov. 15, 2004; the entire disclosure of the prior application is herewith incorporated by reference.

We claim:

1. A method for distinguishing the origin of operator inputs in an electronic control system being a local computer, the method comprising the following steps:

providing at least one first operating element coupled to the local computer and at least one second operating element connected to a remote control computer being remote from the local computer; and processing a first signal in the electronic control system when the at least one first operating element is operated, the first signal differing from a second signal emitted by the at least one second operating element when the at least one second operating element is operated, by virtue of an electronic identifier assigned to the at least one first operating element, the electronic identifier being generated in a signing device and received by the local computer.

2. The method according to claim 1, which further comprises initiating principally the same function in the electronic control system with the signal when the first operating element is operated and the signal when the second operating element is operated.

3. The method according to claim 1, which further comprises providing the signal, when the first operating element is operated, with a signature as the electronic identifier.

4. The method according to claim 2, which further comprises switching a signature, as the electronic identifier, on and off in the electronic control system.

5. The method according to claim 3, which further comprises enabling or blocking particular functions of a program with the electronic control system on the basis of the signature.

6. The method according to claim 5, wherein the functions of the program include safety-critical processes in machines.

7. The method according to claim 6, which further comprises enabling the safety-critical processes only when a signature is present in the signal from an operating element.

8. The method according to claim 5, which further comprises switching the signature on or off on the basis of the program.

9. An apparatus for distinguishing the origin of operator inputs, the apparatus comprising:
  an electronic control system being a local computer having a signing device;
  at least one first operating element connected to said local computer and emitting a first signal upon operating said at least one first operating element, said at least one first operating element having an electronic identifier assigned thereto;
  at least one second operating element emitting a second signal upon operating said at least one second operating element;
  said first signal differing from said second signal by virtue of said electronic identifier, said electronic identifier being generated by said signing device processing said first signal and received by said local computer;
  said electronic control system processing said first signal.

10. The apparatus according to claim 9, which further comprises:
  at least one first computer being said electronic control system to which said at least one first operating element is assigned; and
  at least one second computer to which said at least one second operating element is assigned.

11. The apparatus according to claim 10, which further comprises a network for interconnecting said at least one first computer and said at least one second computer.

12. The apparatus according to claim 11, wherein said network includes an intranet connection.

13. The apparatus according to claim 10, wherein said at least one first computer provides control signals for influencing an operating state of a machine processing printed materials.

14. The apparatus according to claim 11, wherein said network includes an Internet connection.

15. A printing machine, comprising an apparatus for distinguishing the origin of operator inputs, the apparatus including:
  a local computer disposed near the printing machine and having a signing device;
  at least one first operating element connected to said local computer and emitting a first signal upon operating said at least one first operating element, said at least one first operating element having an electronic identifier assigned thereto generated in said signing device and provided to said local computer;
  at least one second operating element emitting a second signal upon operating said at least one second operating element;
  said first signal differing from said second signal by virtue of said electronic identifier being generated in said signing device and received in said local computer; and
  said local computer processing said first signal.

* * * * *